(12) United States Patent
Crevatin

(10) Patent No.: US 7,234,138 B2
(45) Date of Patent: Jun. 19, 2007

(54) METHOD AND COMPUTER PROGRAM FOR PRODUCING A REGULATOR OR CONTROLLER

(75) Inventor: Mario Crevatin, Winterthur (CH)

(73) Assignee: ABB Research Ltd, Baden (CH)

( * ) Notice: Subject to any disclaimer, the term of this patent is extended or adjusted under 35 U.S.C. 154(b) by 1009 days.

(21) Appl. No.: 09/908,685

(22) Filed: Jul. 20, 2001

(65) Prior Publication Data
US 2002/0066072 A1 May 30, 2002

(30) Foreign Application Priority Data
Jul. 27, 2000 (EP) .................. 00810676

(51) Int. Cl.
G06F 9/445 (2006.01)
(52) U.S. Cl. ............... 717/168; 717/106; 717/171; 717/174; 700/20; 700/17
(58) Field of Classification Search .......... 717/113, 717/148; 700/20; 707/1
See application file for complete search history.

(56) References Cited

U.S. PATENT DOCUMENTS

| | | | |
|---|---|---|---|
| 6,615,088 B1* | 9/2003 | Myer et al. | 700/20 |
| 6,754,885 B1* | 6/2004 | Dardinski et al. | 717/113 |
| 2002/0112227 A1* | 8/2002 | Kramskoy et al. | 717/148 |
| 2002/0161745 A1* | 10/2002 | Call | 707/1 |

FOREIGN PATENT DOCUMENTS

| | | |
|---|---|---|
| EP | 0 825 506 | 2/1998 |
| WO | 97/12301 | 4/1997 |
| WO | 99/63409 | 12/1999 |
| WO | 00/20939 | 4/2000 |

OTHER PUBLICATIONS

M. Rezayat, "Knowledge-based Product Development Using XML and KCs," Computer-Aided Design, Sep. 2, 1999, pp. 299-309.
"XML-Based Templates for Generating Artifacts from JAVA-Based Models" Research Disclosure, Industrial Opportunities LTD. Havant, GB, Nr. 416, Dec. 1998, pp. 1678-1680, XP-OOO834144.

* cited by examiner

Primary Examiner—Kakali Chaki
Assistant Examiner—Mark P. Francis
(74) Attorney, Agent, or Firm—Buchanan Ingersoll & Rooney PC

(57) ABSTRACT

To produce a controller or regulator (1), a control or regulation process (3) is first designed and simulated on a development system (20). The process source code (25) for a target system (2) arranged in the controller or regulator (1) is then generated, and also a description file (28, 29) in HTML and/or XML format which, among other things, describes the parameters for the controller or regulator (1). Tags which characterize the parameters are used in the description file (28, 29). The description file (28, 29) is then converted, in a web server generator (30), into data and source code (31, 34) for a web server (5) which can run on the target system (2). In this context, the web server generator (30) and/or web server (5) use/uses the tags to insert input and output elements which can be used for setting and reading the respective parameters. The present system can be used for easily producing an interface for controlling the process (3) running on the target (2), which interface can be used by any client computer (7) without special software.

9 Claims, 2 Drawing Sheets

METHOD AND COMPUTER PROGRAM FOR PRODUCING A REGULATOR OR CONTROLLER

FIELD OF THE INVENTION

The invention relates to a method and also to a computer program for producing a regulator or controller in accordance with the precharacterizing clause of the independent claims.

BACKGROUND OF THE INVENTION

Various development systems exist which can be used for designing and simulating controllers or regulators, such as Matlab® and Simulink® from the company The MathWorks, Inc., Natick (USA).

Such development systems generally permit the designed controllers to be converted into C code, so that they can be compiled using a suitable compiler and can be used as process code on a target system in a regulator.

In addition, the development systems provide the option of testing and altering parameters of the process running on the target system from a client computer. To this end, however, expensive and complex programs generally need to be installed on the client computer.

SUMMARY OF THE INVENTION

The object is therefore to provide a method and software of the type mentioned initially which permits the above problem to be solved in a simple manner.

This object is achieved by the method and by the computer program in accordance with the independent claims.

The development system thus produces a description file which describes at least the parameters of the control or regulation process. In particular, the description file contains the names of the parameters, preferably also the type and the possible values of the parameters. The description file can then be used by one or more suitable programs to generate a web server or data for a web server which is capable of running on the target system (i.e. the controller or regulator) and can provide at least one process control document in HTML format and/or XML or XML/XSL format which contains suitable input and/or output elements for the parameters. The process control document can then be retrieved by a common browser on any client computer, so that the parameters of the process can easily be read and changed.

Preferably, the description file indicates how the parameters are to be shown in the process control document. By way of example, the description file stipulates the order or the locations in or at which the parameters are to be appear in the process control document. Preferably, the description file is likewise in HTML or XML format, which simplifies later conversion.

Preferably, in addition to the description file, a parameter list file is produced which contains a list of the parameters. Generally, common development systems are able to do this. The parameter list file is then used to ascertain the names of the parameters, and the information obtained in this way can be used to examine or parse the description file in order to find out where the parameters appear. The appropriate locations are then suitably marked using control data, preferably using HTML tags. This makes it possible to use the files of a conventional development system to produce a marked description file which can be supplied to a suitable web server generator, for example.

Preferably, the development system is used to produce an access interface file which contains declarations of routines which can be used to access the parameters of the running process code. This access interface file is used when the web server is produced in order to generate code which can be used to access the parameters. This action is particularly suitable for development systems which are able to produce an access interface file.

To produce the web server, a web server source code is preferably produced which is compiled together with the access interface file. The process code also preferably has a process source code produced for it which is compiled and is linked to the web server source code.

Unlike known solutions, in the method according to the invention, the description file and possibly the parameter list file are used to provide control data which are used for automated production of the web server, which is one of the ways in which the present invention contributes to the technical field. The present way in which information is provided also permits interaction of programs (development system, web server generator) which generally operate using incompatible data formats.

Another novelty is the use of an access interface file as control data for a stub filler in order to carry out automated conversion or filling of the stubs into glue code.

The method is preferably in the form of a computer program product which comprises one or more programs or modules and is stored on at least one computer-readable medium or is modulated onto a carrier.

BRIEF DESCRIPTION OF THE DRAWINGS

Other refinements, advantages and applications of the invention can be found in the dependent claims and in the description which now follows using the figures, in which:

DETAILED DESCRIPTION OF THE INVENTION

Figure 1:
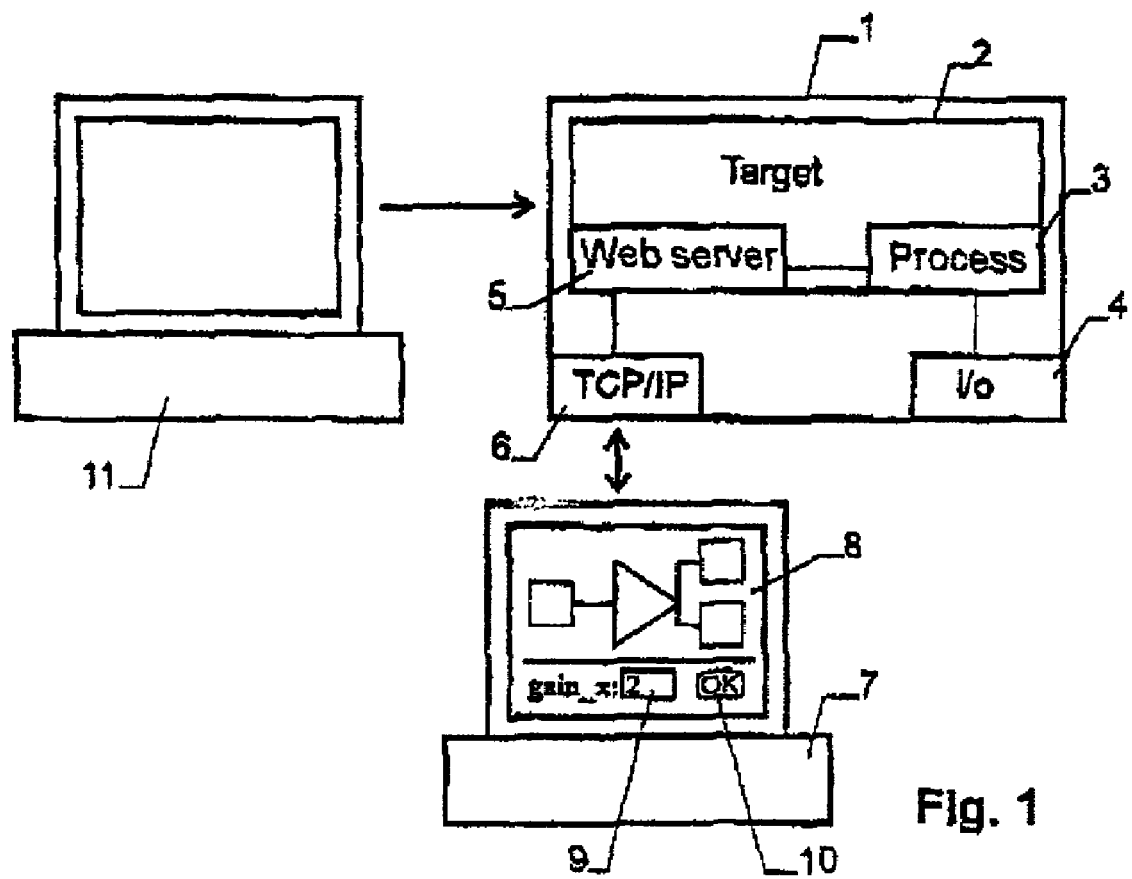
FIG. 1 shows a schematic illustration of the components for the development and for the operation of a controller or regulator.

The most important components for developing and operating a regulator or controller 1 are shown in FIG. 1.

The controller 1 has a target system 2 which is able to execute a regulation or control process 3 which is in the form of a process code. To perform its regulation or control tasks, the regulation or control process 3 can access digital or analog inputs and outputs 4 of the regulator or controller 1.

The target system 2 also runs a web server 5 connected to a TCP/IP interface 6. The web server 5 is able to produce one or more HTML and/or XML documents (process control document 8) which represent the parameters of the process 3 and contain input elements for changing theme. The web server 5 is connected via the TCP/IP interface 6 by means of a line or an arbitrary network, via which the HTML and/or XML document(s) can be retrieved.

In one extremely simple embodiment, the target system 2 can, as an "embedded system", be a microprocessor system without an operating system, or just with a minimal operating system, in which case all the necessary software is contained in the process 3 or in the web server 5. However, the target system 2 can also be in the form of a computer with an operating system which provides the process 3 and the web server 5 with certain services.

FIG. 1 shows a client computer 7 which can be used to request the process control document 8 using TCP/IP and to display it in a web browser. In the present case, the process control document 8 contains, by way of example, a graphical representation of the controller or regulator in the form of a block diagram and also a list of the parameter(s). In FIG. 1, by way of example, a parameter having the name "gain_x" is provided. It is shown together with its current value ("2") in the process control document 8. The value appears in an input field 9, can be edited and can be sent to the web server 5 by clicking on a button 10.

When the web server 5 produces the process control document 8, it first needs to request the value of the parameter(s) to be displayed from the process 3. If the user on the client computer 7 changes the value of the parameter, the web server 5 needs to transfer the new value to the process 3. This requires a suitable link between the web server 5 and the process 3.

The text below describes how a controller 1 and, in particular, the software for the web server 5 and the process 3 can be developed and produced in an efficient manner.

For this purpose, the controller or regulator is first developed on a development computer 11 (or possibly a plurality of computers linked in a suitable manner). The process code is then produced for the process 3, and the web server source code or web server code is produced for the web server 5. These codes are capable of running on the target system 2 and are transferred to each controller or regulator which is to be produced.

Figure 2:
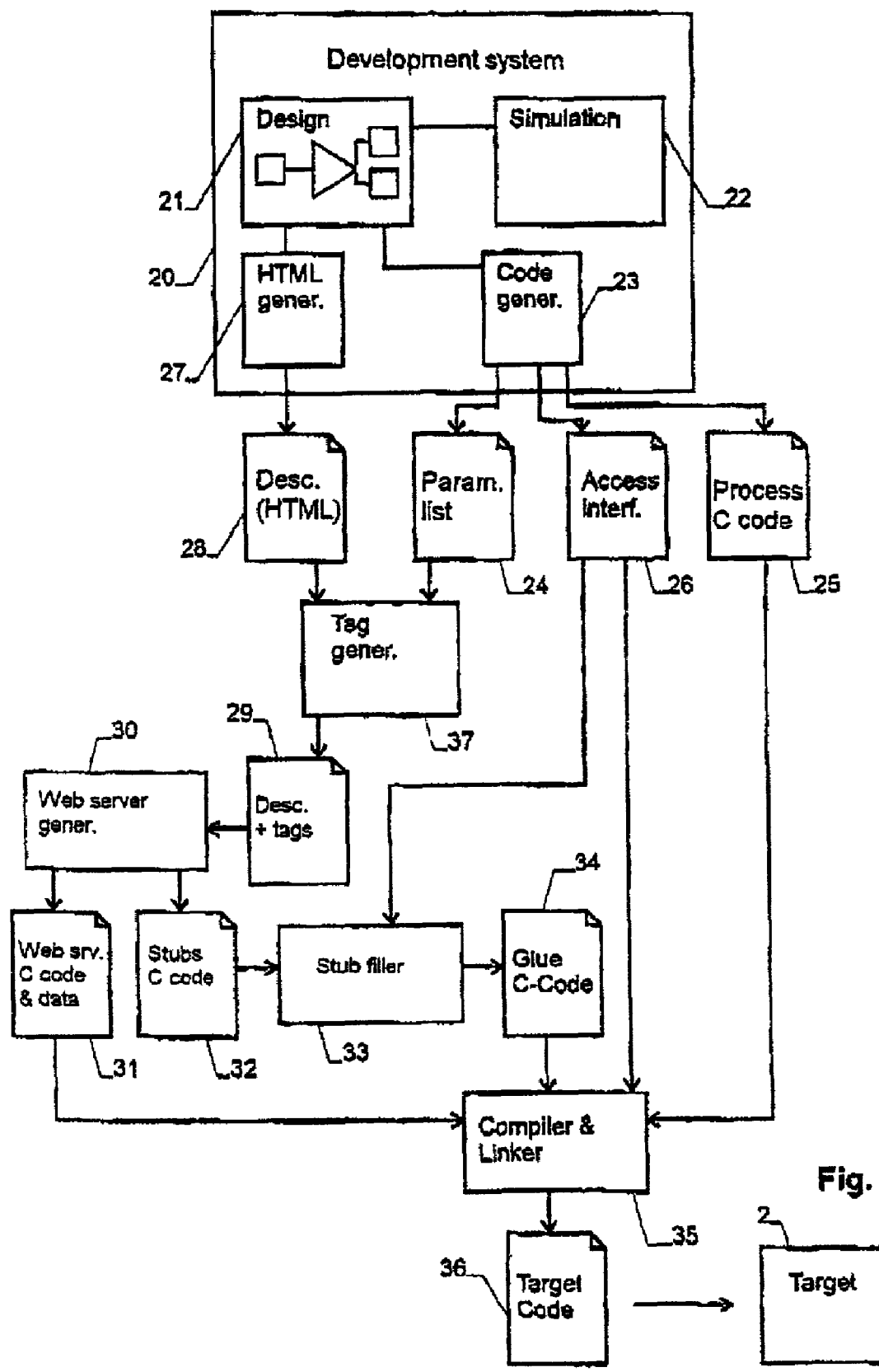
FIG. 2 shows a flowchart with the program components and files in one possible embodiment of the invention.

A preferred embodiment of a flowchart with the program components and files on the development computer 11 is shown in FIG. 2.

In a first step of the development, a development system 20 is used which permits the regulator or controller to be designed and simulated. A design module 21 and a simulation module 22 are available for this purpose.

The design module 21 allows, by way of example, the controller or regulator to be shown in the form of a diagram, and allows the inputs and outputs and also the links between the individual components to be defined. In addition, the parameters stipulating the response of the controller or regulator can be defined. Examples of suitable parameters are gain factors, switch settings, time constants, decision variables and other values. Each parameter has at least a name and a type (e.g. "double", "float", "Boolean"). If appropriate, it may also have other attributes, such as a statement indicating whether it can only be read Or also changed.

In the present example, by way of illustration, a controller or regulator is defined which has an input, an amplifier and two outputs. The parameter provided is the amplifier's gain factor, which is denoted as "gain_x" and has the type "double".

The simulation module allows the response of the controller or regulator defined in this manner to be computer simulated. This permits initial tests on the controller or regulator.

If the design has been completed to the extent that a controller or regulator 1 can be produced, the code needs to be produced for the process 3. For this purpose, a code generator 23 is provided. The code generator takes the design data from the design module 21 and produces three files or file types: a parameter list file 24, the process source code 25 and an access interface file 26.

The parameter list file 24 contains a list of the parameters. In particular, it cites the name and type for each parameter. In the present example, it contains only one entry, which may appear as follows, for example:
  gain_x double The process source code 25 is the source code for the process 3. It contains the routines for executing the control or regulation process on the target system 2. By way of example, it may be a source code in C. The process source code also contains accessor routines which allow the parameters of the process to be read or altered.

The access interface file 26 contains a declaration of the accessor routines, e.g. in the form of a header file for the programming language C. In the example above, it could define the following two routines, for example:
  double read_gain_x(void); //read gain_x
  void write_gain_x(double); //set gain_x (In one specific embodiment, error situations should additionally be tested and appropriate error messages should be exchanged. Thus, the function write_gain_x( ) could return an error message, for example, if the desired parameter value lies outside certain limit values.)

In addition, the development system contains an HMTL and/or XML generator 27 which makes it possible to convert the controller or regulator representation produced in the design module 21 into an HTML and/or XML format and to produce a corresponding description file 28, which should also be understood as meaning a group of a plurality of linked documents The description file 28 contains, e.g. as a link, a diagram of the controller or regulator and also a list of the parameters. An extract therefrom has the following appearance, for example:
  <HTML>
  . . .
  <IMG SRC="diagram.gif">
  . . .
  <P>gain_x: 1.0
  . . .
  </HTML>

The components of the development system 20 which have been described to this extent may be conventional program products, for example. Thus, in particular, it is possible to use Matlab from the company the MathWorks, Inc., which was mentioned in the introduction. In this context, the simulation can be carried out in Matlab itself. A design module which may be used is Simulink® or Stateflow®. The code generator 23 used could be "RealTime Workshop" or "Stateflow Coder", and the HTML and/or XML generator used could be "MATLAB Report Generator" and "Simulink", all from the company The MathWorks, Inc.

The description file 28 and the parameter list file 24 are supplied to a tag generator 37. The tag generator 37 is a computer program or program module and introduces into the description file 28 HTML tags which characterize the parameters, so that the web server 5 is later able to insert the appropriate input and output elements into the process control document. By way of example, the description file can be converted in the manner below.
  <HTML>
  . . .
  <IMG SRC="diagram.gif">
  . . .
  <META
    NAME="parameter info"
    TEXT="gain__x:"
    PARAMETERNAME-"gain_x"

TYPE-"double"
>
...
</HTML>

In the variant shown here, the meta thus replaces the line "<P>gain_x: 1.0" and defines that the text gain_x:", the input field 9 and the appropriate button 10 need to be arranged at the appropriate position.

The description file 29 complemented with the tags is then supplied to a web server generator 30. The web server generator produces the web server source code 31 and the data for the web server 5. It also produces a stub file 32 which contains empty routines ("stubs") for each parameter. These routines are later called by the web server 5 in order to read and write the respective parameters, In the example above, the stub file 32 may define the following routines, for example:

```
double GetParameter_gain_x(void)
{
}
void SetParameter_gain_x(double)
{
}
```

To produce the web server source code and the stub file 32, a conventional product is preferably used, for example EmWeb™ from the company Agranat Systems, Inc., Maynard, USA.

In a subsequent step, the stub file 32 and the access interface file 26 are supplied to a stub filler 33. By way of example, the stub filler 33 may be in the form of an independent program or program module. It inserts the appropriate routine of the access interface file 26 into each routine of the stub file 32 and produces a glue file with glue source code 34. In the present example, a simplified version of this file may have the following appearance, for example:

```
double GetParameter_gain_x(void)
{
  return read_gain_x( );
}
void SetParameter_gain_x(double x)
{
  write_gain_x(x),
}
```

(In this case too, error handling code can preferably also be added.)

The web server source code 31, the glue source code 34, the access interface file 26 and the process source code 25 can now be compiled and linked in a compiler/linker 35 in order to produce a code file 36 with the code, capable of running on the target system 2, for the process 3 and the web server 5. This code can be transferred to the target system 2.

Once installed on the target system 2, the web server 5 provides the client computer 7, upon request, with the process control document 8. In the present example, it could have the following appearance, for example:

```
<HTML>
...
<IMG SRC="diagram.gif">
...
<FORM METHOD="GET", ACTION="/bin/enter">
  <P>gain_x:
  <INPUT TYPE="TEXT" NAME-"gain_x">
  <INPUT TYPE="submit" VALUE="OK">
</FORM>
...
</HTML>
```

In the example above, the development system 20, the tag generator 37, the web server generator 30 and the stub filler 33 are separate programs or program groups. This demarcation is not necessary, however. Thus, by way of example, the HTML and/or XML generator 27 can be designed such that it inserts the tags required for the web server generator 30 directly into the description file, which means that the tag generator 37 can be eliminated. As an alternative to this, the role of the tag generator 37 could also be adopted by the web server generator 30. The stub filler 33 could also be integrated into the web server generator 30 or into the code generator 23.

In the example above, the description file is preferably in HTML format. In addition to this or as an alternative to this, it can follow the XML formatting rules. In this case, instead of the tags, other, XML compatible data structures for controlling the web server generator 30 can also be inserted into the description file.

In the examples above, the parameters appear as a list at the end of the process control document 8. However, it is also conceivable for their values to be inserted directly into the diagram appearing in the top part of the document. In this case, the HTML and/or XML generator 27 needs to be matched such that it provides the space required for this purpose in the diagram, and it is conceivable, for example, for the web server 5 to produce a Java applet which responds to click actions on the parameters appearing in the diagram with appropriate input masks.

In the example above, the tags in the description file 29 are interpreted by the web server generator 30. However, it is also conceivable for them not to be evaluated and converted into corresponding input and output elements until later by the web server 5.

In the embodiment shown in FIG. 2, the code parts, such as the process source code, the web server source code and the glue source code, are first produced as source code and are then compiled and linked. However, it is conceivable for code which can at least in part run directly to be produced, which then need only be linked.

LIST OF REFERENCE SYMBOLS

1: Controller
2: Target system
3: Regulation or control process or process code
4: Inputs and outputs of the regulator or controller 1
5: Web server
6: TCP/IP interface
7: Client computer
8: Process control document
9: Input field
10: Button
11: Development computer
20: Development system
21: Design module
22: Simulation module
23: Code generator
24: Parameter list file
25: Process source code
26: Access interface file
27: HTML and/or XML generator
28: Description file
29: Description file with tags
30: Web server generator
31: Web server source code
32: Stub file
33: Stub filler 34: Glue source code
35: Compiler/linker
36: Code file
37: Tag generator

The invention claimed is:

1. A method for producing a regulator or controller having a target system and a regulation or control process, said regulation or control process being characterized by one or more parameters and implemented as process code which runs on the target system, said method comprising:
   Developing the regulation or control process on a development system,
   Using the development system to produce process code for performing said regulation or control process when executed on the target system,
   Using the development system to produce a description file, the description file describing at least the parameters characterizing the regulation or control process,
   Using the development system to produce a web server to be run on the target system from the description file, the web server being designed to access and change the parameters of the process code running on the target system and to produce a process control document in HTML or XML format which contains input or output elements for the parameters and to produce at least one access interface file having declarations for routines for accessing the parameters of the running process code, and wherein the access interface file is used when the web server is produced in order to produce code for accessing the parameters.

2. The method as claimed in claim 1, wherein the description file comprises statements for arranging the parameters in the process control document.

3. The method as claimed in claim 2, wherein the description file is in HTML and/or XML format.

4. The method as claimed in claim 2, comprising:
   producing a parameter list file using the development system, the parameter list file containing at least one name used in the description file for each parameter, control data being produced in the description file using the parameter list file, the control data characterizing the parameters appearing in the description file, and, in particular, the control data being HTML and/or XML tags.

5. The method as claimed in claim 1, wherein a web server generator is used to produce web server source code for at least part of the web server, and, in particular, wherein the web server source code is compiled together with the access interface file.

6. The method as claimed in claim 5, wherein the web server generator is used to produce at least one stub file having empty routines for accessing the parameters, and wherein a stub filler inserts the routines defined in the access interface file into the routines implemented in the stub file in order to produce a glue source code.

7. The method as claimed in claim 6, wherein process source code is produced for at least part of the process code, the access interface file describing routines implemented in the process source code, and wherein the process source code, the web server source code, the glue source code and the access interface file are compiled and are linked to one another.

8. A computer program product having program code means which are stored on at least one computer-readable medium in order to carry out the method as claimed in claim 1 when the computer program product is executed on at least one computer.

9. The method of claim 1, comprising: transferring a code file with process code and webserver code to the target.

* * * * *